United States Patent [19]

Mardhekar et al.

[11] Patent Number: 5,528,558
[45] Date of Patent: Jun. 18, 1996

[54] INTERNATIONAL TIME INDICATING SYSTEM

[76] Inventors: Dhananjay V. Mardhekar, 'Vandan', 53/5, Sant Nagar, Pune-411 009, Maharashtra State; Ravindra K. Patwardhan, 1979, Sadashiv Peth, Pune-411 030, Maharashtra State, both of Ind.; Rajeey Pandit, 45, Brookhaven Dr., Glastonbury, Conn. 06033

[21] Appl. No.: 290,018

[22] Filed: Aug. 12, 1994

[30] Foreign Application Priority Data

Jan. 7, 1994 [IN] Ind. .................. 1/BOM/1994

[51] Int. Cl.⁶ .............................. G04B 47/00; H04M 1/26
[52] U.S. Cl. .................. 368/10; 368/13; 368/21; 379/354
[58] Field of Search ............................ 368/4, 10, 13, 368/21–23, 82; 379/354–356

[56] References Cited

U.S. PATENT DOCUMENTS

| | | | |
|---|---|---|---|
| 4,669,891 | 6/1987 | Rosevear | 368/21 |
| 4,887,251 | 1/1989 | Takada | 368/21 |
| 5,027,387 | 6/1991 | Moll | 379/112 |
| 5,216,709 | 6/1993 | Wen et al. | 379/354 |
| 5,258,964 | 11/1993 | Koma et al. | 368/47 |
| 5,309,500 | 5/1994 | Koma et al. | 379/58 |
| 5,375,104 | 12/1994 | Ishii et al. | 368/22 |

*Primary Examiner*—Vit W. Miska
*Attorney, Agent, or Firm*—McCormick, Paulding & Huber

[57] ABSTRACT

An international time indicating system is associated with a telephone for automatically displaying a specific time and date of a called place upon entering the international access code, called country code, and called area code if necessary. A called time and date are calculated via time zone offsets stored in system memory by determining the difference in time between a time zone of a local place of a caller and a time zone of a called place. The offsets are defined with respect to a reference time zone. The difference in time is then offset in order to determine the called time.

22 Claims, 9 Drawing Sheets

INTERNATIONAL TIME INDICATING SYSTEM

This invention relates in general to a real time clock and deals more particularly with an international time indicating system for a telephone designed to display, for a long distance call, the specific time and date of the distant place the caller intends to reach as soon as the caller dials the country code of the distant place.

BACKGROUND OF THE INVENTION

A modern telephone unit offers many features like memory, timer, hold, automatic re-dialing, mute, volume adjustment, speaker, answering system, etc. As people scattered throughout distant countries are better able to do business with one another due to modern air transportation and communication systems, a growing number of people are conducting business with countries spaced far and wide.

For example, consider a man working in a business office in the United States (U.S.A.) who often needs to call parties in different countries such as Indonesia, Venezuela or Sweden, etc. The caller will likely use a telephone directory to find the appropriate telephone country code. However, the caller preferably needs to know the exact local time of the caller's destination in order to place the call during business hours at the remote destination. Since it is often inconvenient or impossible to find a catalog of time differences of various countries, the caller is compelled to make a call blindly. Such a blind call often results in wasted time and money because the call is not made during normal business hours in the foreign country.

To make more cost efficient telephone calls, it is desirable to have a feature associated with the telephone which will provide information regarding the time in a distant country by entering the country code. A simultaneous display of a caller's local time and the specific time of the called country will better enable the caller to place the telephone call at an appropriate time so as to eliminate the need to search out the call destination time.

U.S. Pat. No. 4,887,251 issued to Takada shows a world timepiece that is not associated with a telephone which provides time and date information of areas in different time zones by inputting "area code" information. However the timepiece of Takada is wasteful of hardware because it uses a separate internal timepiece where each timepiece is dedicated to one of at least twenty-four time zones.

Therefore, in response to the foregoing problems, it is an object of the present invention to provide a cost effective international time indicating system using a single timepiece associated with a telephone to provide information regarding the specific time and date of the destination of a telephone call by means of entering the international access code followed by the country code and if necessary, followed by the area code.

It is also an object of the present invention to provide a simultaneous display of the caller's local time and date and the time and date of the destination of the telephone call.

SUMMARY OF THE INVENTION

According to the present invention, an international time indicating system is associated with a telephone for automatically displaying a specific time and date of a called place. The international time indicating system comprises means for entering or adjusting information associated with a local place of a caller comprising a caller's local time, local date, international access code, local country code, and local area code if necessary. Means for entering a telephone number sequence is associated with a called place which may include telephone code information comprising an international access code, called country code, and a possible called area code. Means for pre-storing time-zone offsets of country and area codes is associated with places which may be called throughout the world. The offsets are defined with respect to a reference time zone. Means are provided for calculating a called time and date by determining the difference in time between a time zone of a local place of a caller and a time zone of a called place. The difference in time is then offset in order to determine the called time. A local time display for automatically displaying local information comprising a caller's local time, local date and international access code, local country code, and a possible local area code. A remote time display automatically displays remote information comprising a called time and a called date associated with the destination of a phone call as soon as the telephone code information is entered. Means is provided for displaying time, date and telephone code information on the appropriate local and remote time displays.

DETAILED DESCRIPTION OF THE PREFERRED EMBODIMENT

An embodiment of the present invention will be explained below with reference to the accompanying drawings.

Figure 1:
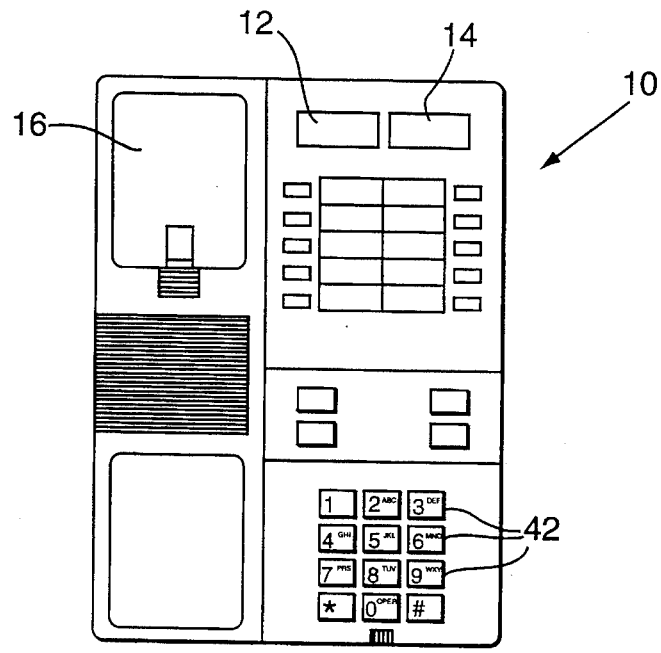
FIG. 1 illustrates the incorporation of an international time indicating system of the present invention in a telephone unit.

Referring to FIG. 1, an embodiment of the international time indicating system of the present invention is incorporated in a telephone unit generally denoted by 10. The telephone unit 10 respectively includes local and remote time displays 12 and 14. The local and remote displays may each be incorporated in separate windows, as shown in FIG. 1, or may be incorporated within a single window. The local time display 12 is positioned near handset 16 and is designed to display a caller's local time preferably with an AM/PM indicator, and the caller's local date. For long distance calls, the local time display 12 may also include the international access code, such as "00" when calling out of India, followed by the country code and area code of the caller's destination, with or without an asterisk, whose function will be explained later. The remote time display 14 is designed to display the called country's local specific time with or without an asterisk and the called country's date.

Figure 2A:
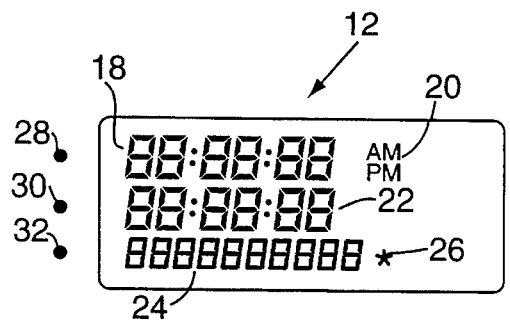
FIGS. 2A and 2B is an enlarged partial view of FIG. 1 respectively showing an inactivated display for the local time of the caller and an inactivated display for the remote time of the called place.
Figure 2B:
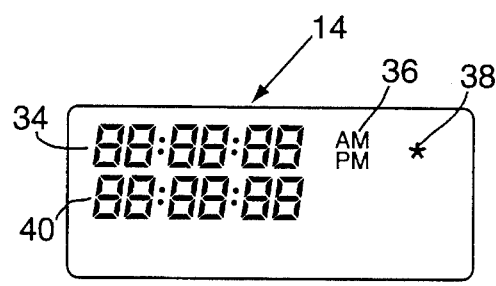

FIGS. 2A and 2B respectively show an enlarged view of the local and remote time displays 12 and 14. Referring to FIG. 2A, an upper line 18 in the local time display 12 displays the caller's local time in seven segment display which is continuously updated in the sequence: hours/minutes/seconds along with an AM/PM indicator 20. A middle line 22 displays the local date in seven segment display, preferably in the sequence: month/date/year. A lower line 24 includes ten digits each comprising a seven segment display. The number of digits in the lower line can be increased beyond ten digits if needed. The segments are selectively activated to display the international access code followed by the caller's own country code with or without area code. An asterisk 26 is provided to the right of the digital segments for purposes to be explained later. Information entering buttons 28, 30 and 32, preferably located to the left side of the local time display 12, are designed to enter or adjust the caller's local time as displayed in the upper line 18 along with the AM/PM indicator 20, the caller's local date as displayed in the middle line 22, and the international access code followed by the caller's country code with or without area code and an asterisk when required.

FIG. 2B shows an enlarged view of the remote time display 14 first shown in FIG. 1. An upper line 34 displays the called country's time in seven segment display in the sequence: hours/minutes/seconds which is continuously updated along with an AM/PM indicator 36 and an asterisk 38 whose function will be explained later. A lower line 40 displays the called country's date in seven segment display.

Figure 6A:
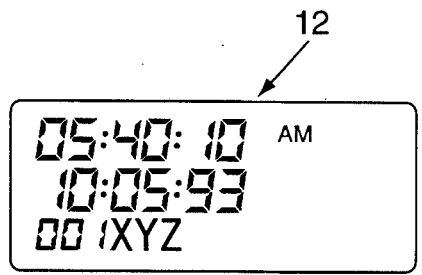
FIGS. 6A and 6B illustrate two possible ways of initializing the local display by a caller whose telephone area code covers two time zones.
Figure 6B:
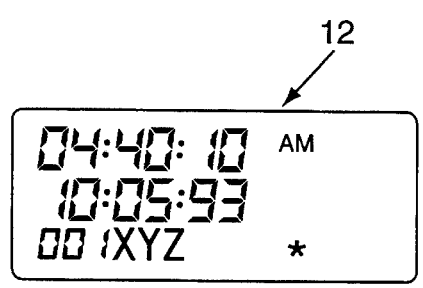

The information to be entered in the local time display 12 via the information entering buttons 28, 30 and 32 will now be explained in detail. Referring again to FIG. 2A, the caller will first enter the local time with AM/PM to be displayed in the upper line 18. The caller will then enter the local date in the middle line 22. In the lower line 24, the caller will enter the international access code followed by the local country code. If the caller is in a large country with more than one time zone, the caller will have to enter an area code after entering the country code. The caller may be in a problematic area having two time zones within a single area or country code. In this case, the caller can arbitrarily select a convention to determine whether he is in the western or eastern 'side of the time dividing line. For example, the caller can enter an asterisk at the right of the lower line 24 as shown in FIG. 6B to show he is in the western side of the time dividing line. Of course, the caller could have selected the eastern side of the time dividing line as the predetermined condition for entering an asterisk.

The information to be entered in the local time display 12 will have to be done only once, at the time when the telephone unit 10 is installed. The local time display 12 will continuously display the local time, local date and local code with or without an asterisk for forming reference information for the computing system.

Standard press buttons 42, as shown in FIG. 1, for "dialing" the telephone are included in the international time indicating system and are connected with an internal computing system such that the impulse generated by pressing the buttons passes to the computing system as well as to the telephone electronic exchange.

An internal computing system, incorporating electronic components, utilizes the entered reference information in the local time display 12 to calculate the time and date of the desired remote place to be called, as soon as the caller dials the international access code followed by the country code with or without area code of the remote location to be called. The impulse generated by the dialing of the remote place is computed with the reference information so as to determine the exact time and date of the desired remote place which is displayed in the remote time display 14.

The local time display 12 continuously shows the caller's local time, date and code with or without an asterisk, irrespective of a call. The remote time display 14, however, will be blank when the telephone is not in use, or when an incoming call is received, or when the caller makes a call to a place which lies in the caller's own standard time zone.

The local display shown in FIGS. 2A and the remote display shown in FIG. 2B may be respectively provided in separate windows wherein each display can be simultaneously activated. However, the displays shown in FIGS. 2A and 2B may be provided within a single window wherein the local and remote displays shown in FIGS. 2A and 2B are non-simultaneously activated in alternating sequence with respect to one another. Also, the remote display may be modified so as to be substantially similar to the local display shown in FIG. 2A. Thus modified, the caller will be able to simultaneously see both the telephone number in the local display corresponding to the caller's location and the dialed telephone number in the remote display corresponding to the called place.

The remote time display 14 will display the specific time and date of the desired called place when the desired called place lies in a different time zone—giving an immense advantage to the caller, who can simultaneously visualize his own time and the time and date of the called distant place. The remote time display 14 will continue to function until the call is disconnected, thereupon which the remote time display 14 will become blank. Displaying the specific time and date of the desired distant place is useful when only dialing the international access code and country/area code. This allows the caller to access remote time and date information free of cost without going through with the call. The caller can plan his call such that the time will be suitable to the called party.

Figure 3A:
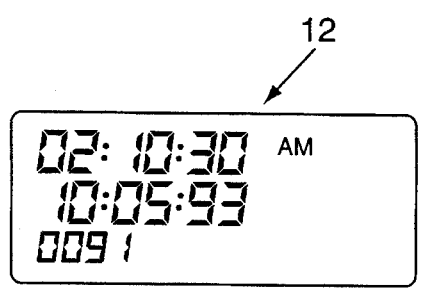
FIGS. 3A and 3B respectively illustrate an activation of the local time and remote time displays of the present invention.
Figure 3B:
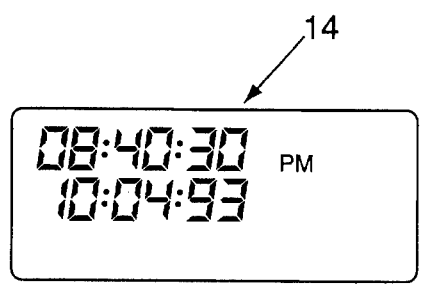

The function of local and remote time displays 12 and 14 will now be further clarified with reference to the following example as shown in FIGS. 3A and 3B. Say, for example, a caller is in Bombay, India and wishes to call someone in the United Kingdom (U.K.). The caller has already initialized the local time display 12 at the time of installation of the telephone, by entering the information as shown in FIG. 3A, namely, local Indian time, local Indian date, the international access code for calling out of India "00", and country code "91" which is specific for India. Since, India has only one standard time zone, there is no necessity of entering an area code or an asterisk. As the caller at Bombay dials the international access code "00", the international time indicating system is activated. Next, as the caller proceeds to dial the country code "44" for the U.K., the impulse received by the computing system interacts with the reference information shown in the local time display 12 in the following manner. First, the computing system with standard electronics, understands that "44" represents the U.K. and further understands that "44" represents the only time zone in the U.K. such that there is no need for further entering an area code for its computing. Second, the number "44" is further computed with the number "91" present in the lower line 24 of the initialized local time display 12, as shown in FIG. 3A, in order to define the time difference between the local and called time zones—which is five hours and thirty minutes in the present example. Third, The international time indicating system understands whether to add or subtract the defined time difference. In the present example the defined time difference is to be subtracted. The defined subtraction of time difference is computed with Indian time, 02:10:30 AM (as shown in FIG. 3A) at that moment, with the resultant destination and display of the U.K. time, at that moment, which is 08:40;30 PM, in the remote time display 14, as shown in FIG. 3B. Fourth, the computing system defines the date in the U.K. with reference to the date in India displayed in the local time display 12. In this case, the date at Bombay is 5th Oct. 1993, as shown in FIG. 3A and the defined and displayed date in the UK is 4th Oct. 1993, as shown in FIG. 3B.

In smaller countries, where only one standard time zone exists, the country code alone is sufficient for the internal computing system to calculate the exact remote time. However, in large countries like the U.S.A. where more than one time zone exists, the large country must be further divided into smaller units which are represented by specific area codes.

For large countries like the U.S.A., which are conventionally subdivided into smaller areas represented by specific area codes, the computing system is initialized to understand a country code followed by an area code as a single unit, having a defined area and a specific time and date. The single unit functions like a small country having a single standard time—the only difference being that the small country is represented by a specific country code alone, while a place in the U.S.A. is represented by the country code followed by an area code.

Let us use as an example an instance involving a caller staying outside of a large country like the U.S.A. (for example at London) who desires to call a distant place in the U.S.A. Here, the dialing of the international access code "00" activates the international time indicating system. Furthermore, dialing the number "1" is recognized by the computing system as representing the U.S.A. The computing system is now primed to wait and receive an area code. After entering the area code, the computing system will interact with the caller's country and area codes to define the time difference between the caller's local time (shown in the local time display 12) and the called location, and to define whether to add or subtract the time difference. Similarly, the date of the distant place in the U.S.A. is defined. The defined time and date of the desired distant place to be called in the U.S.A. is displayed in the remote time display 14.

Figure 4:
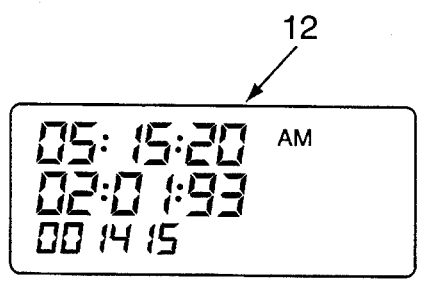
FIG. 4 is an example of initializing the local time display by entering an international access code, country code, and an area code.

A caller residing in a large country like the U.S.A. will have to first initialize, in the lower line 24 of the local time display 12, the international access code followed by the country code and the area code representing the caller's area. In the U.S.A., the international access code is "011". As an example, FIG. 4 shows, in the lower line 24 of the local time display 12, the entered number "0111415".

The convention for a caller residing in a large country like the U.S.A. when the caller desires to call a distant place in his own country lying in a different time zone is illustrated in the following example. The telephone unit 10 incorporating the international time indicating system is activated by the impulse generated by dialing "1" Here, the computing system recognizes that the caller is staying in the U.S.A. and is calling a location within the U.S.A. Further dialing the area code is recognized and computed with reference to the caller's time and date and code of the initialized local time display 12 with the resultant display of the specific time and date of the dialed place in the U.S.A. which is displayed in the remote time display 14. Thus, the international time indicating system is useful even when the caller residing in the U.S.A. is making a call to a location within the U.S.A. Here, the caller can immediately see the: time and date of the called place in the U.S.A. as soon as he dials "1" followed by the appropriate area code.

More generally, the international time indicating system can be initialized to recognize that a caller and called place are both within a single country or region covered by the country code by means of a national subscriber dialing (NSD) access code. In other words, the international time indicating system can recognize that dialing an NSD access code instead of the international access code means that a call is to be made within the country or region corresponding to the NSD access code, and that an area code, if necessary, will immediately follow. For example, the region of the U.S.A. and Canada share an NSD access code "1" (which happens to be the same as the "country" code which is also shared by both the U.S.A. and Canada). Therefore, dialing the NSD access code "1" within the U.S. or Canada informs the initialized international time indicating system that the call is to be made within the region covered by Canada and the United States, and that an area code will immediately follow.

Figure 5:
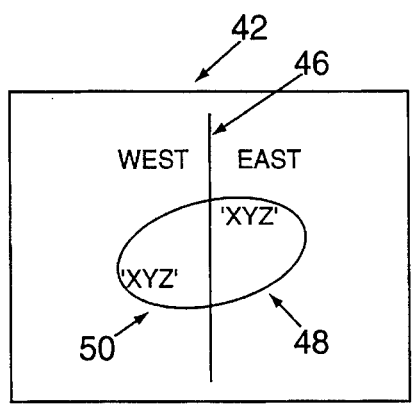
FIG. 5 is a simplified map showing the problem of problematic area codes that may include more than one local time.

In large countries like the U.S.A., certain areas have a specific area code which may cover two time zones, as shown in FIG. 5. Consider, for example, the area code of one of the problematic areas 44 is "XYZ". The time dividing line 46, as shown in FIG. 5, has split the area having the area code "XYZ" into an eastern part 48 and a western part 50. When the time in the eastern part of area "XYZ" is 8 AM, at the same moment, the western part of area "XYZ" is 7 AM.

The caller staying in a problematic area enters in the local time display 12 his own time, date and code and if necessary an asterisk. A caller in a predetermined side of a time dividing line, such as the western side, can alert the time indicating system of which time zone he is in by entering an asterisk. When the caller enters the international access code followed by the country code ("1" in U.S.A.) followed by the appropriate area code "XYZ", the computing system is primed to understand that the time associated with the area code "XYZ" is the time of the eastern part of the problematic area. Such information is shown in the local time display 12 as illustrated in FIG. 6A. Here, it can be observed that the information entered in the local time display 12 is just like the information needed to be entered by any other caller who is calling from a non-problematic area in the U.S.A. A caller, having an area code "XYZ" and calling from the western part of the time dividing line, as shown in FIG. 5, will need to enter the local time and date, with the international access code followed by the country code ("1" in U.S.A.), followed by the area code "XYZ", followed by an asterisk. Here, the asterisk will signal a one hour correction for calculating the time and date of the desired distant place. A one hour correction is needed because the computing system understands for its computing (according to convention) that the code containing "XYZ" without an asterisk means the eastern part time of the time dividing line of the problematic area having area code "XYZ".

With respect to the above-discussed convention, consider that a caller to the western of the time dividing line enters the information in the local time display 12, as shown in FIG. 6B. Though the moment is the same for FIG. 6A and FIG. 6B, a one hour time difference is due to the caller of FIG. 6B being to the west of the time dividing line. To correct for this one hour time difference compared to the area east of the time dividing line, an asterisk is entered so that the computing system will understand to correct the one hour time difference in its computations which otherwise will not be understood by the computing system.

Figure 7A:
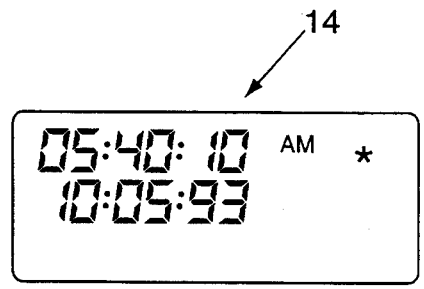
FIGS. 7A and 7B respectively show the remote time displays of distinct destination calls within a problematic area that are in different time zones from one another.
Figure 7B:
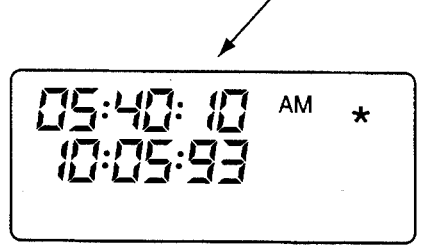

Now consider a caller residing outside the U.S.A.—say at Bombay, India—and calling a party in the U.S.A. having an area code "XYZ" associated with a problematic area. Here, the caller must understand the possibility of a one hour error. According to the inventor's suggested convention, as the caller dials "001XYZ", the computing system will display the eastern side time of the problematic area. Here, as shown in FIGS. 7A and 7B, the computing system will display an asterisk in the remote time display 14 because the system recognizes "001XYZ" as a problematic area. Referring to FIG. 7A, the time and date of a called destination residing in the eastern side of the problematic area having an area code "XYZ" is shown in the remote time display 14. Though the time displayed in this case is accurate, the computing system is unable to determine whether the called location is to the east or to the west of a time dividing line which separates adjoining time zones in the problematic area. Therefore an asterisk is displayed to alert the caller that the called place may be to the west of the time dividing line, and therefore, the remote time may be in error by as much as an hour. Referring to FIG. 7B, the time and date of a called destination residing in the western side of the problematic area having an area code "XYZ" is shown in the re,note time display 14. The time displayed is one hour in error. The correct time is 04:40:10 AM while the time shown is 05:40:10 AM. The displayed asterisk informs the caller of the possibility of a one hour error. Thus the display of an asterisk in the remote time display 14 informs the caller about the possibility of a one hour error in the display as well as, in the rare case, a one day error in the date.

Figure 8:
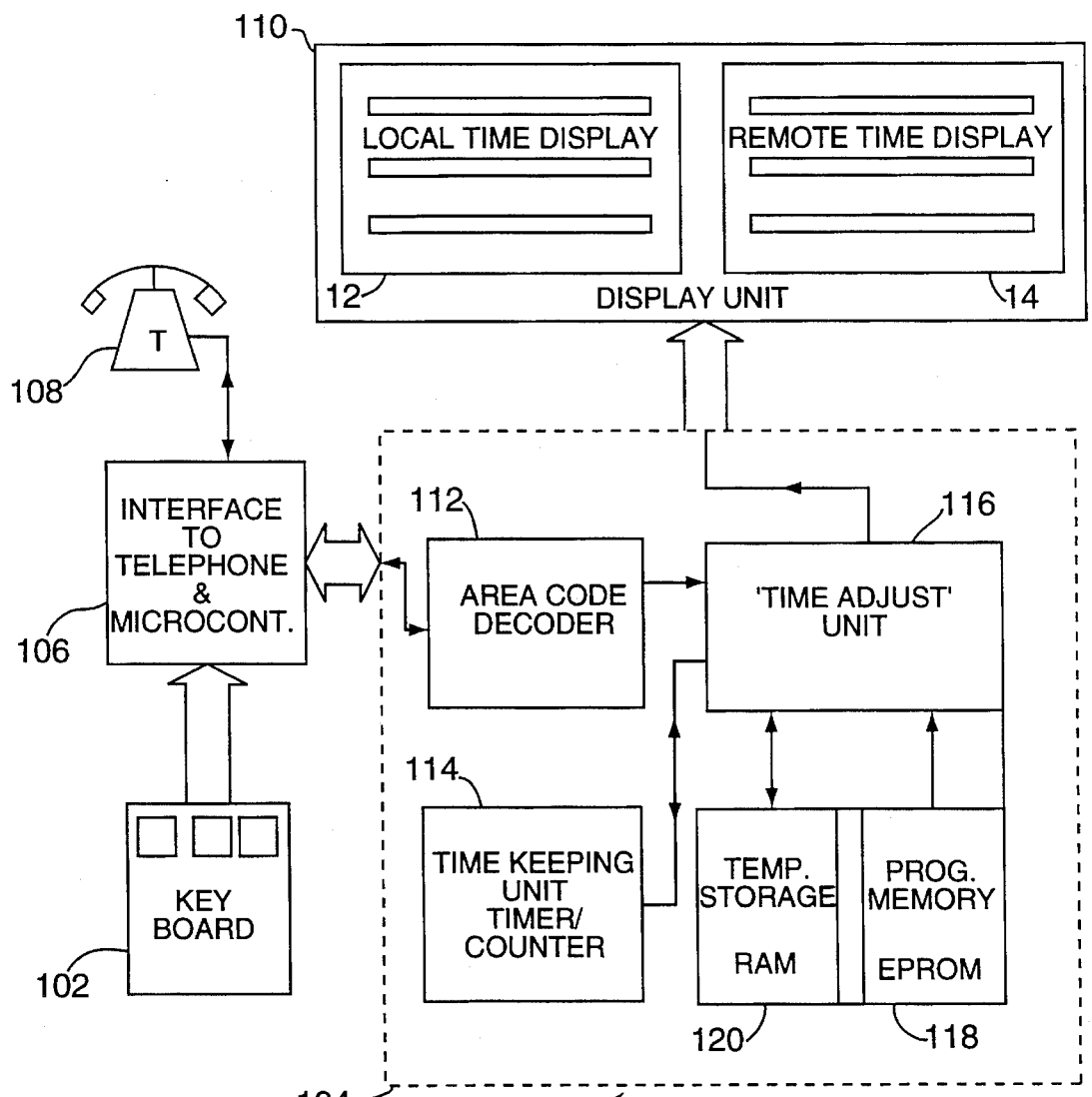
FIG. 8 is a block schematic diagram illustrating a preferred embodiment of the international time indicating system of the present invention.

A schematic diagram of a preferred embodiment of the present invention is shown in FIG. 8. An international time indicating system 100 includes a keyboard 102 suitable to dial a desired telephone number consisting of a numeric digit string as required by a telephone system with international standards and sufficient to provide additional data entry as required by a time of day micro controller (TDM) 104. The TDM 104 may be built up around a single chip micro controller or any other suitable counterpart to implement different functional blocks as shown in FIG. 8. An interface 106 includes conventional circuitry to couple the keyboard 102 to a telephone 108 and the TDM 104 to enable continuous scanning of the keyboard 102 as well as to output the scan code (a digital code unique to each key) upon every valid key entry to the TDM.

In summary, the interface 106 detects a single digit or string of digits to be dialed in a manner compatible to the telephone 108. The interface then transfers the same dialed string of digits or other suitable data as desired by the invented mechanism to either initialize the local time of day, date and location code at the local time display 12 or to enable and maintain alternate operations such as accepting country names or mnemonics of the distant place. The interface also re-transmits the single digit or string of digits to be dialed to the telephone 108 in a compatible manner. This digit transfer may be used in response to the country code names or mnemonics allowed to be entered from the keyboard 102 while a caller is attempting a long-distance call.

A display unit 110 includes a local time display 12 and a remote time display 14. The local display 12 displays local time of day, corresponding date and location code—that is the local area code and/or zone indication. The remote time display 14 displays current time of day, date and location code of the called number.

An area code decoder 112 retrieves the called location code from a dialed number that is received through a key buffer (not shown). The key buffer is a set of memory bytes used as a register to store the key scan codes of the keys pressed from the keyboard. The area code decoder extracts the location code from the international access code, country code and, if necessary, the area code when dialing the desired number.

A time keeping unit 114 uses a timer counter circuit and a crystal stabilized clock to continuously maintain the current time; and other information as required by the local display 12 after the prior initialization of the local display 12 through an independent initialization routine. A time adjust unit 116, reading the remote location code obtained while dialing a distant call, is used to process the data under a program control by the corresponding software resident in the program memory, conventionally known as read only memory/erasable programmable read only memory (ROM/EPROM) 118. The time adjust unit 116 may use necessary parameters and look-up tables stored in the ROM/EPROM 118 along with an image buffers, replica of the data bytes used to refresh the local and remote time displays 12 and 14, maintained in temporary storage memory, conventionally known as random access memory (RAM) 120.

Time difference due to different geographical locations is defined as offset in time and is stored in an offset time register. The time adjust unit 116 uses the location code to time offset look-up tables preprogrammed in the ROM/EPROM 118 to derive the data corresponding to the possible time difference (relative time offset) between the distant called place and the local place of the call and to further compute the remote time from the local time. The time adjust unit 116 then continues to update the local and remote displays 12 and 14 by polling the time of day clock from the time keeping unit 114 and image buffers of corresponding displays in the RAM 120 until a remote abort command is received from the interface 106 subsequent to the end of dialing the distant call. This inhibits the remote time display 14 while maintaining the local time display 12.

The area code decoder 112, the time adjust unit 116, the time keeping unit 114, the program storage ROM/EPROM 118 and the temporary storage RAM 120 may be implemented with micro controller techniques using single chip microcomputers such as the 87 CH51 (CHMOS version of the 8751) or application specific integrated circuit (ASIC) or Intel 8751 or its ROM-less equivalent version 8031 with standard Intel 2764 EPROM memory. Hence, any suitable and equivalent microcomputer chip set may be used in conjunction with the present invention.

Figure 9:
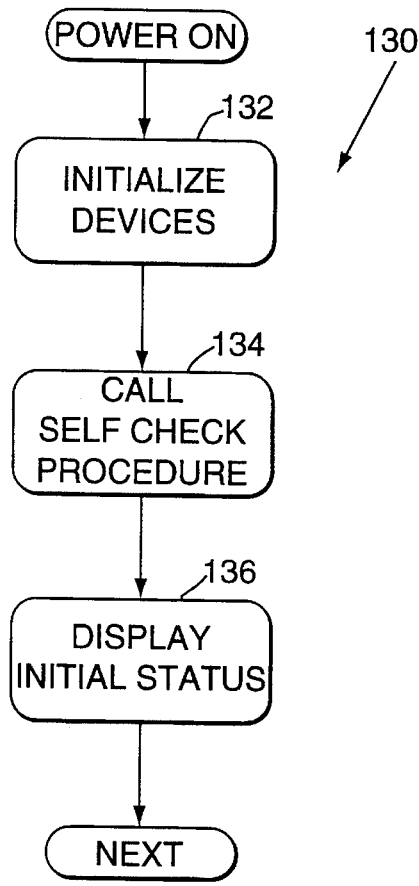
FIG. 9 is a flow chart describing the initial operation of the time of day micro controller unit in the embodiment of FIG. 8.

Software implementation requires a number of program routines and procedure calls to fulfill the system requirements. For example, FIG. 9 illustrates a power on initialization routine 130 which consists of the sequential steps of power on initializing devices (step 132), calling a self check procedure (step 134) and displaying default or error status (step 136) and is followed by a loop back sequence of keyboard scan, display refresh and time register update cycles to be explained later. Local time initialization is carried out with corresponding key commands and parameters to set local time registers and display time of day, date and location code information at the local time display 12 thus enabling a time adjust procedure for the remote time display 14 whenever a distant call is dialed thereafter. A more detailed description of the above-mentioned software programs will be discussed below.

Figure 10:
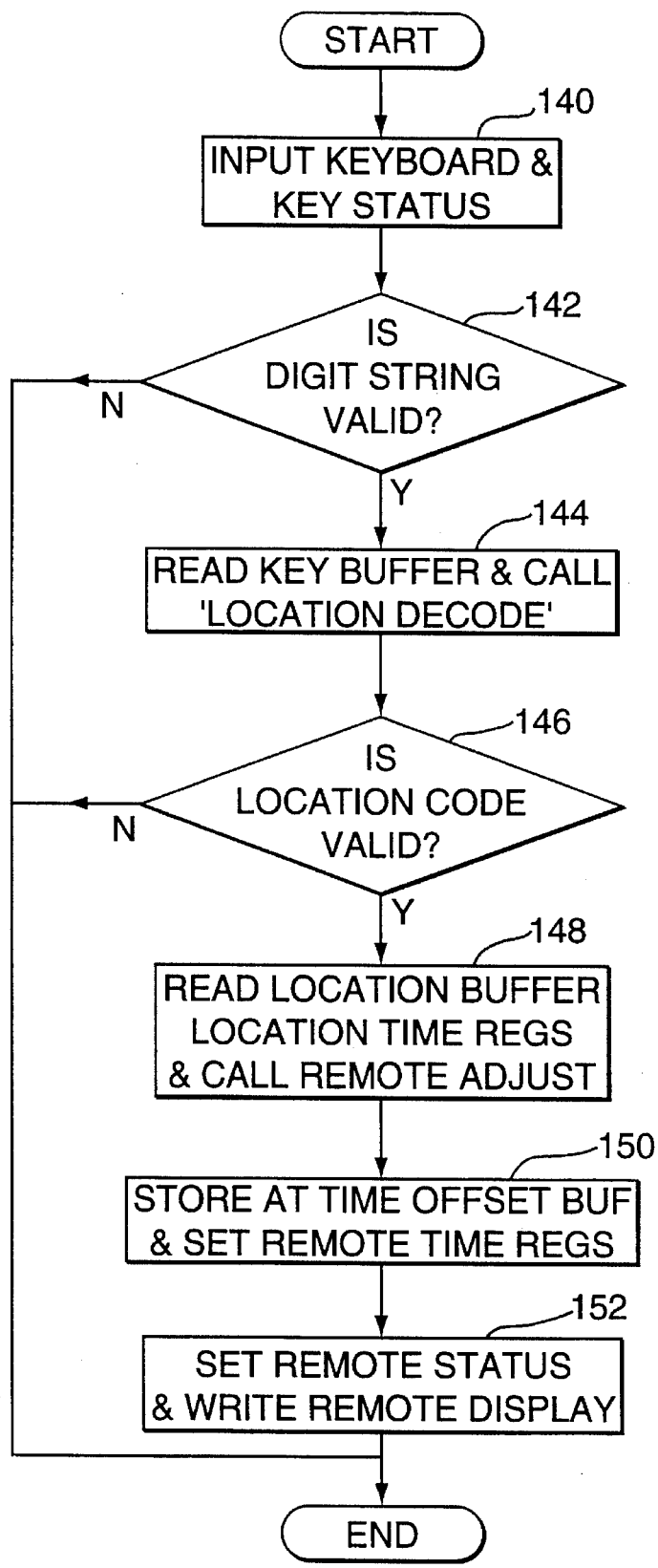
FIG. 10 is the main flow chart of the operation of the present invention.

FIG. 10 shows the main flow chart that assumes the following. First, a power-on condition with the system properly initialized and tested for equipment status has already taken place, as was described with reference to FIG. 9. Second, the local time is already initialized to display all necessary data at the local display 12 including its location code. Third, the telephone circuit is appropriately enabled to transmit the digit string to be dialed for a distant call. The keyboard interface holds such status to be read by the time of day micro controller. Fourth, a polled routine in a known conventional manner may be assumed to, test the time of day clock status which is a memory bit used as a normal status flag which is set active after each preset time interval generated by the time keeping unit 114 and is reset back by the micro controller polled routine. It updates time registers whenever the status is found active. Fifth, no "call over" or "abort call" commands are received from the telephone unit before the execution of the main routine shown in FIG. 10. These assumptions help to understand the invention more clearly without branching to the secondary program routines.

Keyboard scanning and key-status check is first performed (step 140). Key detection implies a valid key entry with necessary Debounce time and key-status setting to indicate the type of data received at the key buffer. Thus, a command key or a function key or a simple digit number key can be distinguished to call an appropriate control routine. While dialing a distant call, key status further indicates the first digit entry or completion of a valid digit string. Step 142 indicates the corresponding test to enable further processing at step 144. A valid digit string stored at the key buffer is then passed to the procedure called "location decode program" wherein a necessary data like international access code, country code and, if required, an area code is retrieved to create a corresponding location code which is a multi-bit unique code corresponding to the remote location dialed. A location buffer in RAM 120 holds this code and decision step 146 tests its validity as well. Step 148 executes another call for a remote adjust program where RAM data from the location buffer and local time registers are read to calculate relative time offset of the remote location with respect to the local location code. The look-up table in ROM/EPROM 118 is used to get the time offset as one of the computing variables. In step 150 the time offset buffer in RAM 120 is loaded with the relative time offset and the same is used to process the data for the remote time registers which is made possible due to the prior initialization of the local time registers. At step 152, the remote status of the remote time display 14 is set active as the corresponding image buffers in RAM are output to the remote time display.

The time keeping unit 114 shown in FIG. 8, can utilize different techniques to set and maintain a time of day. Micro controller designs use one or two timer/counter channels to relieve the central processing unit (CPU) from this routine task. An 8/16 bit T/C channel may be programmed to pre-scale the system clock (1 MHz to about 16 MHz) down to 50/60 Hz. This precision time interval generator is used by another T/C channel or a real time clock (RTC) device working with small CPU overhead to update and maintain the time of day data.

Upon power-up, the CPU starts these T/C channels in appropriate modes—strobe/square wave generator in BCD counter mode—with suitable count divide ratios in auto reload fashion. The time of day clock thus initialized, either interrupts the CPU after every second or its sub multiple to enable the time register update service or to provide corresponding status to be read and cleared by the CPU.

Approximately 16 bytes may be reserved per set to maintain the data from seconds to year of day and location code with special status in a packed or unpacked BCD code. Each of the local time, remote time and set points during the year or day requires such 16 byte records in time register form. A single time of day clock and time offset data computed by the CPU is enough to maintain the time of day at different locations. Also through an appropriate and successive comparison, different additional functions may be performed. As an illustration, such additional functions of the time keeping unit may include advancing or retarding the remote or local time by, for instance, one hour, on a specific day of the year for a specific location.

The time update cycle may be performed every second as indicated above or through successive steps every 50/100 msec., if the total time involved is excessive to cover in a single burst of execution.

A 16 byte record for any time register set provides one/two bytes each for storing current data regarding: seconds (0–59), minutes (0–59), hours (1–12 and AM/PM status), day/date (1–7/1–31), months (1–12), and the year in four digits. Additional data space is associated to store information such as: location code (6 digits with status), area code in conventional manner, relative time offset, and data set point which is a variable to compare total days of the current month, depending on the current month data (28/29/30/31) and current year data.

Status bits associated with the location code provide for specific correction/indication of the predetermined area codes.

An update cycle starts with seconds data correction and propagating the carry, if detected, through minutes data up to the last year register. Any status dependent comparison is further carried if so required. Similar updating may be performed for the remote time whenever the corresponding time registers are found initialized.

The time adjust unit 116 is responsible for several functions. One such function is local time initialization. Separate time set keys are used to select the time set function, to select "day", "date", "time", in sequence, to set data through the same digit dial keys and to enter the local area code with problematic zone declaration if so required. A second function is a time update cycle. The CPU overhead in incrementing the time registers is required in addition to T/C channels in the time keeping unit. A third function is the relative time offset calculation. One of the techniques used is to maintain a time offset for the local time as well as for a remote time depending on the location code derived by a location code decoder. The location code to time offset look-up table is stored in the ROM/EPROM memory area.

The time adjust calculation may be carried out by the following procedure. This time adjust procedure requires necessary data such as found in the local time register. This provides time of day and area code data stored in the corresponding set of locations (memory bytes) with the status bits indicating that this register is appropriately loaded. Other data needed is found in the remote location register where a remote location code is stored by the area code decoder.

In EPROM, a stored program memory holds a look-up table to provide time offset and status bits corresponding to each location code. Time of day information corresponding to any suitable location code (representing a geographical location describing, for instance, Mean Greenwich Time) is assumed as a reference time data and the required time offset, a signed value in time units is predetermined for every geographical location as implied by the corresponding location code. A sign is set so as to provide the appropriate time of the specified location by calculating a simple algebraic sum of reference time data and time offset data. Location codes of local and remote areas are first used to calculate a relative time offset of the remote location with respect to the local area as set in the local time display 12. The remote time registers are then set simply by finding an algebraic sum of the local time data and the relative time offset so calculated. The result is then displayed in the remote time display 14. Display information to both displays is repeated every time the time update cycle updates the time registers.

Figure 11:
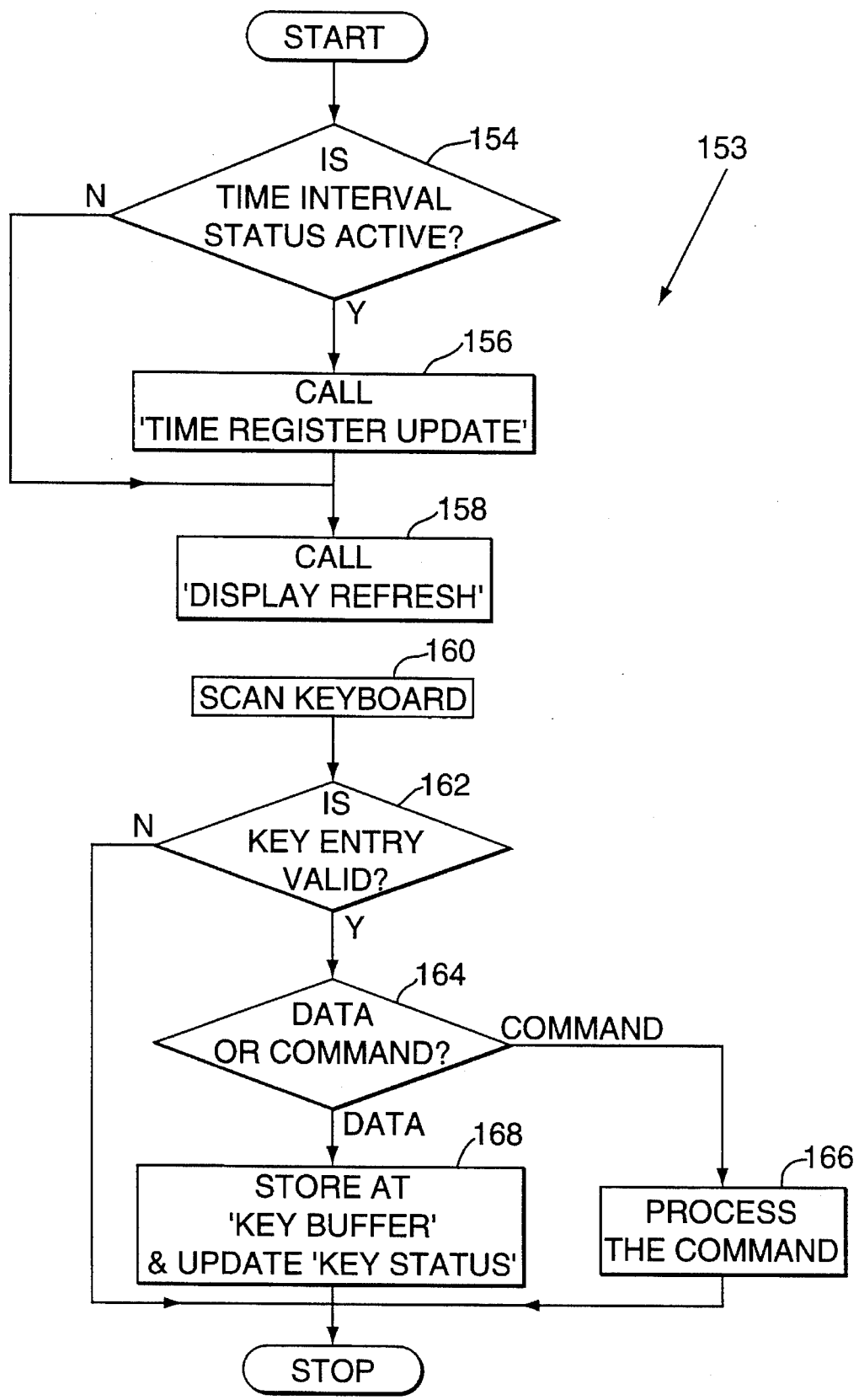
FIG. 11 is a flowchart of a major portion of a loop-back polling subroutine of the present invention.

FIG. 11 is a flowchart indicating a major part of a loop-back polling routine 153 executed by the resident software of the system. It performs three repetitive operations in sequence. At step 154, the time keeping unit 114 (see FIG. 8) sets the time interval status active every time the preset time interval is over (e.g., one second). It is polled continuously by the time adjust unit for executing the time register update (step 156). The display refresh step 158 is subsequently carried out and program control is transferred to a keyboard scan routine (step 160). If any key is found pressed, valid entry is tested at decision step 162 under the current condition of the system (e.g., dial digit string is accepted only under an off-hook handset condition). The corresponding key-code is further decoded to distinguish command keys from data entries at step 164. Commands (e.g., F1, a time set command), if detected, are processed as in step 166 and data is written into a key buffer with an updating of key status as shown in step 168.

The location code and time set operations will now be discussed in detail. The micro controller program requires the location code to fetch data from the look-up table stored in the ROM/EPROM memory. The look-up table provides all necessary data specific to every location code. A typical entry requires several data bytes to hold all of the information. It may be arranged in the form of an array of records, where each record is pointed by the location code to which it belongs. The time offset is used to adjust the remote time register status bits like "set point present", "display zone mark" and "read miscellaneous data" are selectively used for each location code. Additional data is preset as parameters to be used by the micro controller whenever corresponding status bits are found active. Some of the status bits are described below.

One status bit is "set point present". If a specific location requires a time correction on a specific day of the year, then the record entry to this location code includes this status bit as active with the subsequent provision of the time set point and time correction offset representing the desired time correction on that day.

A second status bit is "zone mark". If a specific location code desired from the dialed telephone number points to different time offsets on east/west zones, then an asterisk indication on the display may be provided while displaying local time against this location code. This status bit is set active in the corresponding record entry. No further parameter is required.

A third status bit is "read miscellaneous data". Certain additional data along with the remote time is more helpful to the caller trying an international call. Displaying the status of the current date as, for instance, a national holiday of the called country can be useful for aborting the call if so required. Provision of a number of set points representing national holidays as a parameter set is then stored in the corresponding record. Holiday status may be indicated as "H" in the corresponding display such as the remote time display.

An array of records so described are preprogrammed in the permanent storage memory area (i.e., program memory 118). Any probable change in location code and/or the corresponding data may be reprogrammed by the user if EEPROM memory is used instead of ROM/EPROM memory devices.

Figure 12:
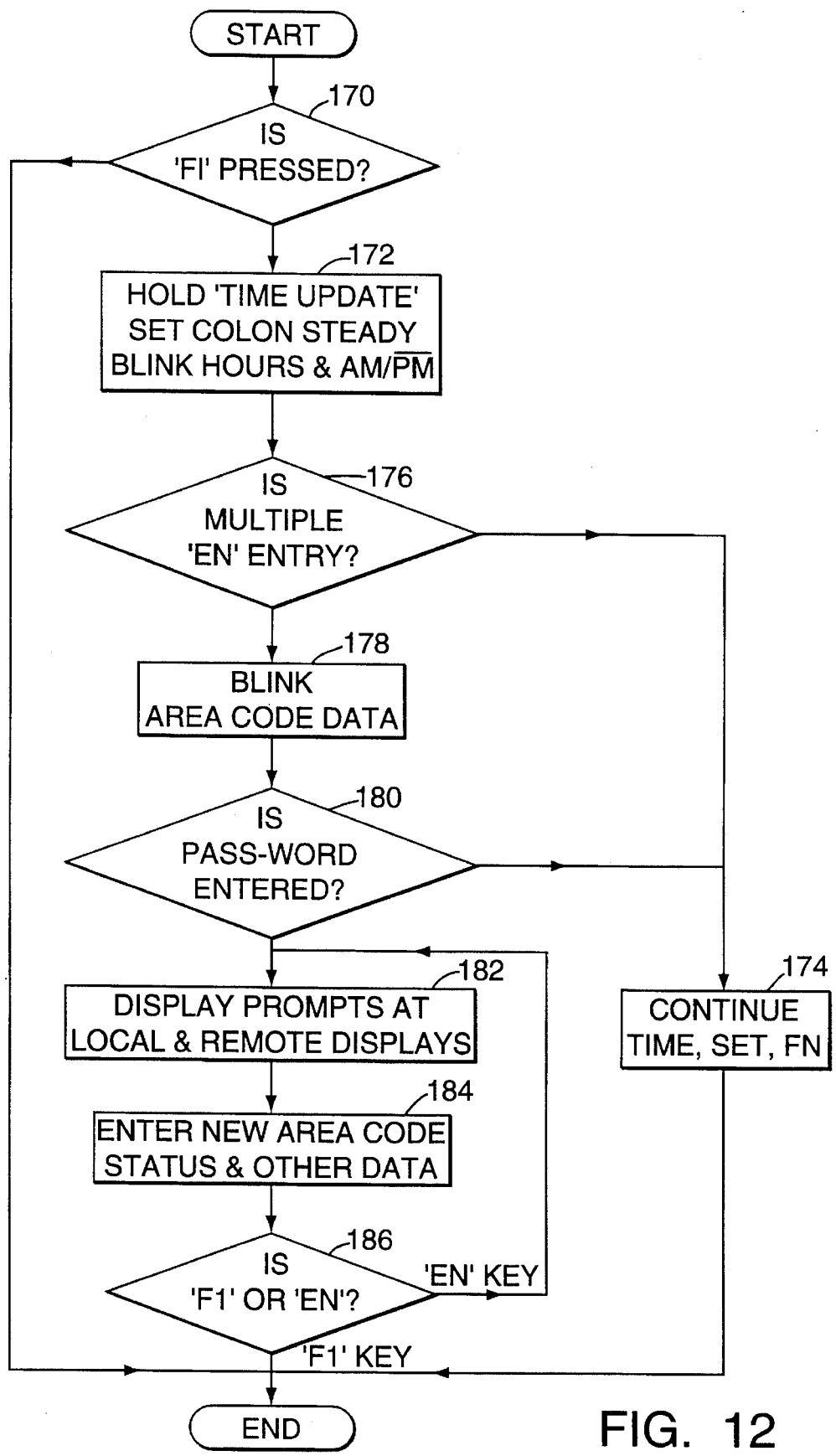
FIG. 12 is a flowchart of a reprogramming subroutine of the present invention.

FIG. 12 refers to a flowchart to enable such reprogramming using the function keys F1 (time set function) and EN (data enter command keys) along with other numeric keys. The F1 key is used (step 170) to select area code programming or time set function and the same key is de-selected by operating F1 (step 170) again. Activating F1 suspends the time update operation with a steady colon segment and initially blinks the hour display with the AM/PM indicator (step 172). During the time set operation this data may be changed by the desired numeric entry. A single EN entry allows continuation of the same time set operation (step 174). A multiple EN key entry (step 176) activates the area code reprogram function. Location code data in the local time display 12 blinks with the remaining display blanked (step 178). A "password data", a specific number different than any possible location code is required to be entered at this time. Any location code entry may transfer the control to the normal time set function.

With the appropriate password entry, the display 12 and 14 shown in FIG. 1 are now prepared for accepting the reprogrammed codes (step 180). The local display 12 represents old data and the remote display 14 indicates a new code and data upon subsequent entry (step 182). Initially the local time display 12 shows a local location code already present in the memory with a status bit "T" and time set point in place of day-date with time offset at the hours-minutes display position. Blinking data prompts as a cursor position indicating the next numeric entry position in the remote display 14. Entering new data with the EN key shifts the blinking data position to the local display 12 (step 184). This step prompts the user to the specific next location code to be modified. The process may continue until the F1 key is detected to exit this reprogram routine (step 186).

Thus for every location code to be modified, old data is displayed at the local time display 12 and a new data entry at the remote time display 14. Data bytes corresponding to the new location code, time set point and time correction offset with status segment "T", zone setting with status segment "Z" and other data-like "national holiday" set points with status "H" are to be loaded in succession. Only then does blinking shift to the local display 12 requiring the next location code to be changed.

Figure 13:
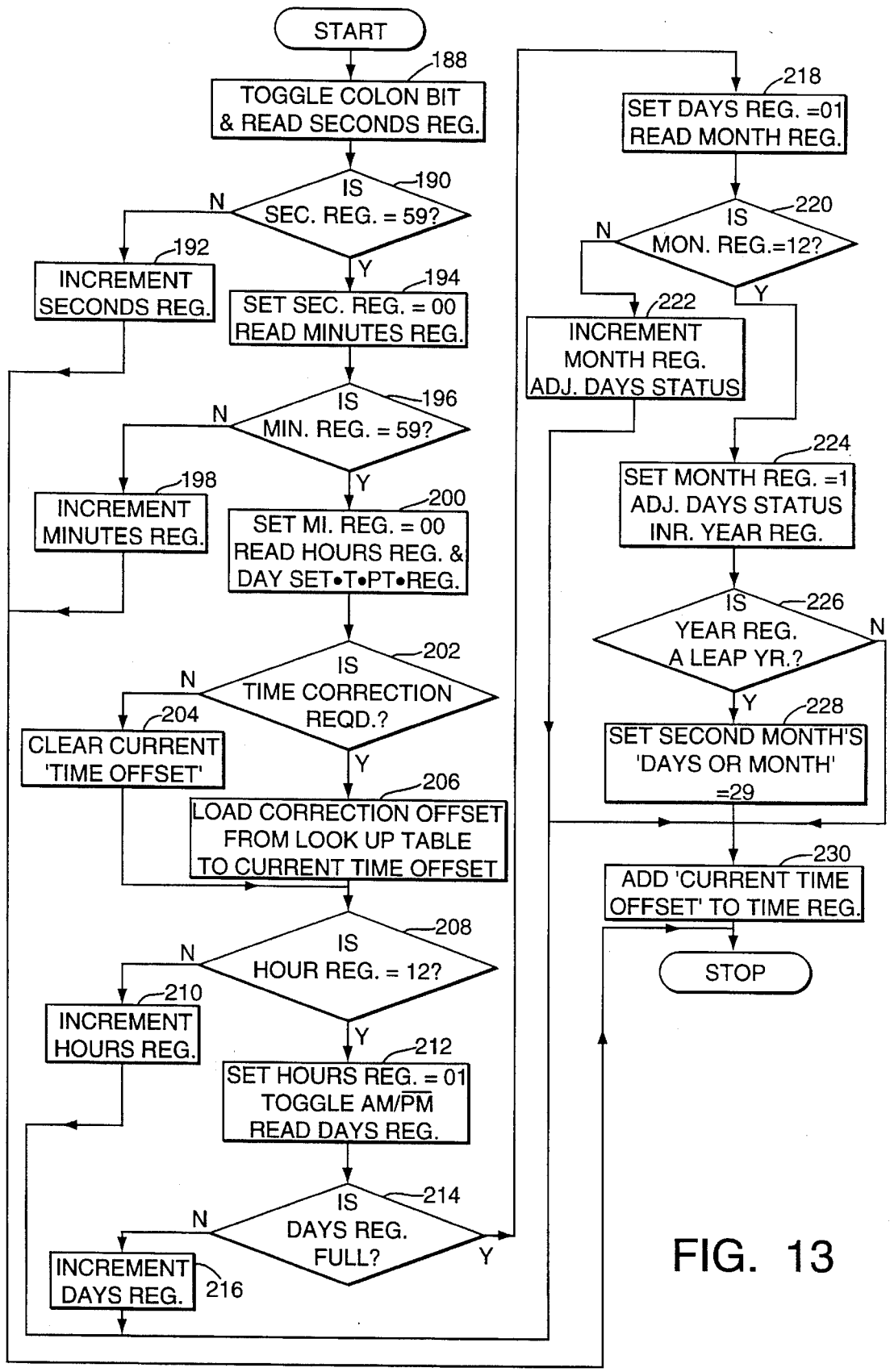
FIG. 13 is a flowchart of a time-register-update subroutine of the present invention.

FIG. 13 shows more details of the procedure call "time register update". A colon segment toggles every second along with the increment in the seconds register and the decimal adjust operation (step 188). Real time counting requires a carry generation and propagation during the count increment of seconds and minutes beyond 59, which is shown in the steps 190 to 200. The time set point is also tested by comparing the data from the time set point register with the current time of day every hour or every day. In FIG. 13, the testing is done every hour (steps 202–206). For example, once or twice a year a time correction adjustment may be necessary to account for daylight savings time. The corresponding time correction refers to the specific correction requirement as described below.

The time correction offset for the location code is stored at the correction offset register and is loaded, when needed for a time adjustment, from the correction offset register into the current time offset register (step 206) to be used to adjust the time registers at the end of the update cycle (step 230). Updating the hours data (steps 208–212) includes toggling of the AM/PM display segment (step 212). Updating operation of the day register (steps 214–218) considers the days status register that stores the number of days for the current month. Change in the month (steps 220–224) then reloads the days status register with the new value from the corresponding look-up table (steps 222 or 224). During the adjustment of the year data at step 224, the possibility of having a leap year is checked at step 226 to alter the days of the month data to be 29 for the month of February (step 228). After completing the time register updating just explained, which is applicable to both the local and remote time, the CPU control is transferred back to the main line program to execute the next routine.

Figure 14:
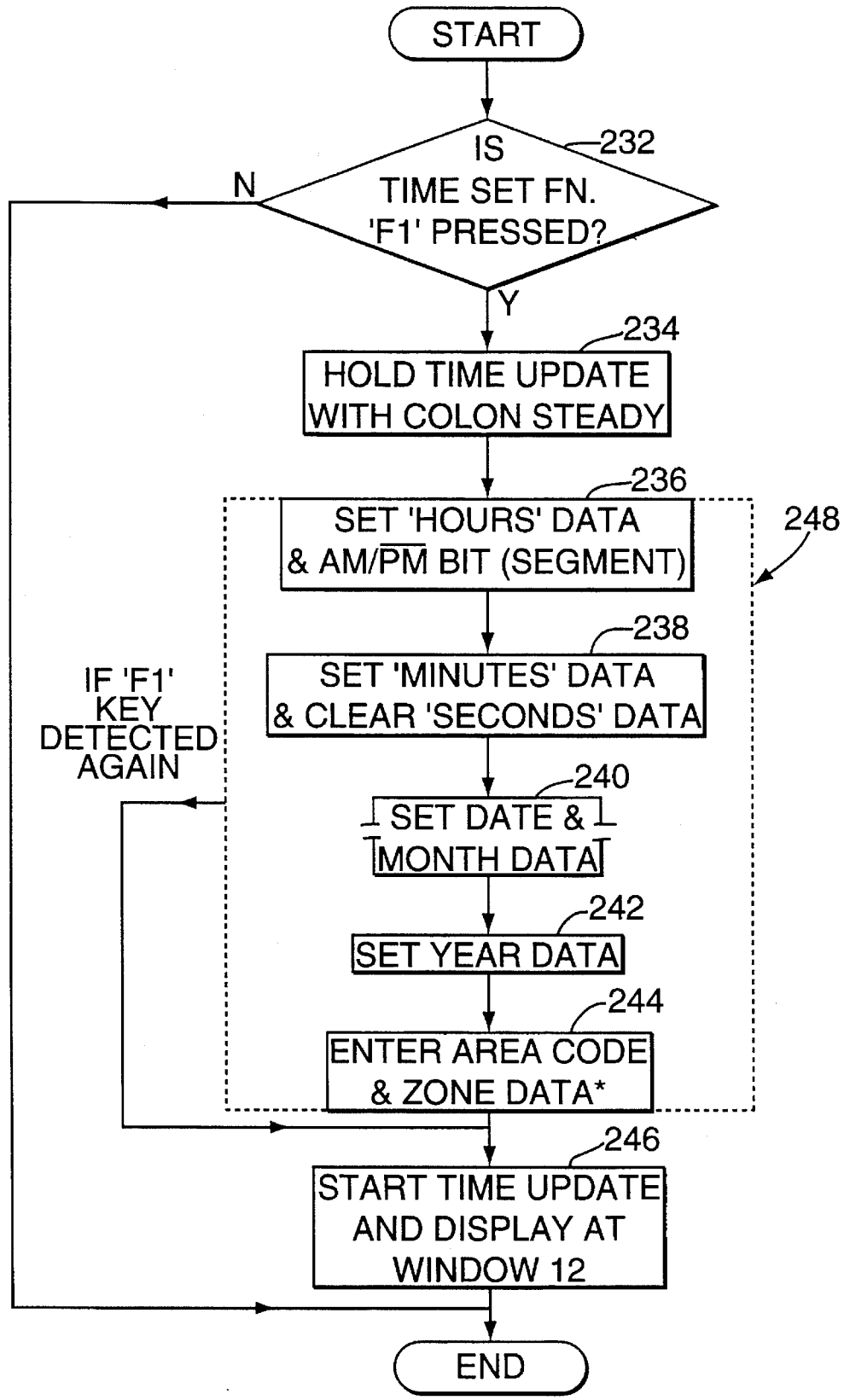
FIG. 14 is a flowchart of a time-set subroutine of the present invention.

A conventional time set operation may be achieved with the function keys F1 and EN as explained earlier and the numeric digit keys available for a telephone call. FIG. 14 shows a simplified flowchart for the same. Upon detecting the F1 key (step 232), the system branches to the time set program mode 248. The time update cycle stops (step 234) and the time registers display the current data from hours to area-code in a sequence. Blinking data prompts as a cursor position for the data entry and EN key operation enters the blinking data which is then stored back to the time register. As shown in steps 236 to 244, the time set sequence steps forward with each EN operation. The completion of step 244 or a multiple operation of the F1 key any time during this operation will exit the sequence and restart the time display (step 246).

Figure 15:
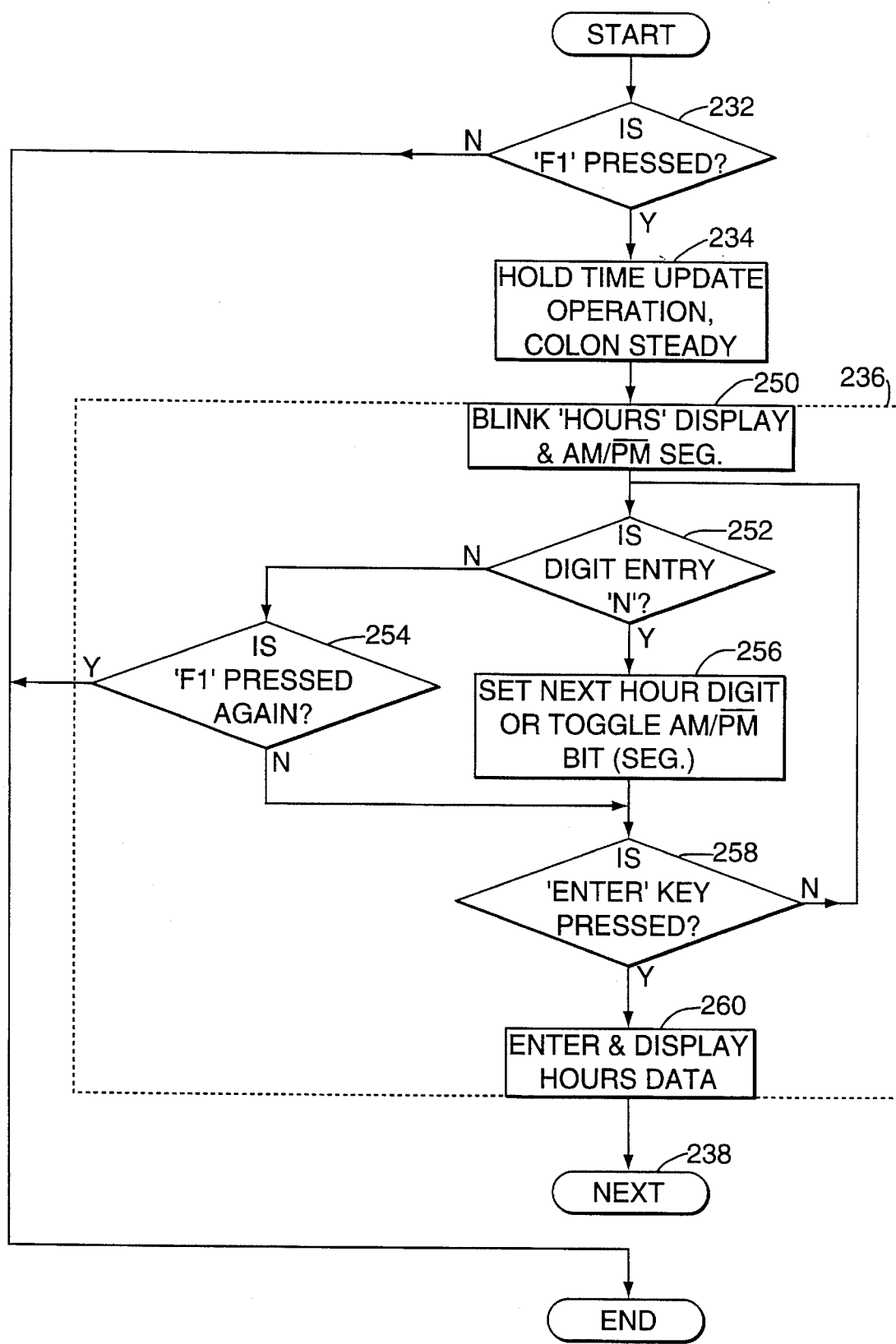
FIG. 15 is a flowchart showing in greater detail a portion of the time-set subroutine of FIG. 14.

FIG. 15 is a more detailed time update sequence of step 236 of FIG. 14 illustrating the data set operation of the set-hours-data operation (steps 250–260). Setting other parameters such as minutes, date, month, etc., is done in a similar manner. Referring again to FIG. 14, entering the last data corresponding to the location code step 244 automatically starts the time cycle update and local time is displayed at the local display 12 (step 246).

The above description thus indicates certain embodiments of the present invention, and it is apparent to those, expert and skilled in the art, that numerous variations or modifications may be made without departing from the scope of the present invention as claimed.

We claim:

1. An international time indicating system associated with a telephone for automatically displaying a specific time and date of a called place, said international time indicating system comprising:

means for entering or adjusting information associated with a local place of a caller comprising a caller's local time, local date, international access code, local country code, and local area code if necessary;

means for entering a telephone number sequence associated with a called place which may include telephone code information comprising an international access code, called country code, and a possible called area code;

means for pre-storing time-zone offsets of country and area codes associated with places which may be called throughout the world, the offsets defined with respect to a reference time zone;

means for calculating a called time and date by determining the difference in time between a time zone of a local place of a caller and a time zone of a called place, and then offsetting the difference in time to the local time in order to determine the called time;

a local time display for automatically displaying local information comprising a caller's local time, local date and international access code, local country code, and a local country area code;

a remote time display for automatically displaying remote information comprising a called time and a called date associated with the destination of a phone call as soon as the telephone code information is entered; and means for displaying time, date and telephone code information on the appropriate local and remote time displays.

2. An international time indicating system as defined in claim 1, wherein the means for entering or adjusting information further includes means for entering problematic information associated with specific country or area codes that cover two time zones, and the system further includes local and remote problematic indicators respectively associated with the local and remote displays, the local problematic indicator being activated if a caller is in a predetermined one of the two time zones associated with the local country or area code, the remote problematic indicator being activated when a called country or area code covers two time zones so as to warn a caller that the called time and date as displayed may be off by about an hour from that of the actual time in the called country.

3. An international time indicating system as defined in claim 1, wherein each of the local and remote displays include an AM/PM indicator.

4. An international time indicating system as defined in claim 1, wherein the local and remote displays are provided in a single display window and the local and remote information are non-simultaneously displayed in an alternating sequence.

5. An international time indicating system as defined in claim 1, wherein the local and remote displays are respectively provided in separate local and remote display windows, the local information being shown in the local display window and the remote information being shown in the remote display window.

6. An international time indicating system as defined in claim 1, further including means for sequentially entering letters for spelling a country, means for automatically associating a spelled country with its country code and possible area code, and means for displaying the time and date in the spelled country in the remote display so that a caller can determine the called time and date of a destination call without having to memorize the country code and possible area code of the destination country.

7. An international time indicating system as defined in claim 1, further including means for sequentially entering letters for spelling a mnemonic of a country, means for automatically associating a spelled country with its country code and possible area code, and means for displaying the time and date in the spelled country in the remote display so that a caller can determine the called time and date of a destination call without having to memorize the country code and possible area code of the destination country.

8. An international time indicating system as defined in claim 1, wherein the international time indicating system is in the form of an independent unit or an attachment to an existing telephone.

9. An international time indicating system as defined in claim 1, wherein the international time indicating system is incorporated in an existing telephone.

10. An international time indicating system as defined in claim 1, further including means for storing predetermined time adjustment dates throughout the year (usually twice a year) that are associated with time adjustments in specific countries, and for adjusting the local or remote time to be displayed accordingly.

11. An international time indicating system as defined in claim 1, wherein the local and remote information to be displayed is in seven segment form.

12. An international time indicating system as defined in claim 1, wherein the local and remote information to be displayed is in dot matrix form.

13. An international time indicating system as defined in claim 1, further including means for suppressing the display of the international access code.

14. An international time indicating system as defined in claim 1, further including means for switching-off the display of the international access code, the local country code and the possible local area code information.

15. An international time indicating system as defined in claim 1, wherein the problematic indicator is in the form of an asterisk.

16. An international time indicating system as defined in claim 1, wherein the problematic indicator is in the form of the letter E.

17. An international time indicating system as defined in claim 1, further including means for storing national holiday information associated with countries throughout the world and a holiday status indicator for displaying such information, said holiday status indicator being activated when there is a national holiday in a called country.

18. An international time indicating system as defined in claim 17, wherein the holiday status indicator is in the form of the letter H.

19. An international time indicating system as defined in claim 1, wherein the means for pre-storing time-zone offsets of country and area codes is in the form of EEPROM memory instead of standard ROM/EPROM memory so that any probable changes in country codes, area codes and/or corresponding data may be reprogrammed by a user.

20. An international time indicating system as defined in claim 1, wherein the system is an independent unit which may be attached to an existing telephone or may be incorporated in other electronic devices such as calculators, computers, or software packages.

21. An international time indicating system as defined in claim 1, further including:

means for initializing the international time indicating system with a national subscriber dialing (NSD) access code so that the international time indicating system recognizes the country in which the system is installed, and that initially dialing an NSD access code instead of the international access code signifies that a caller and the called place are both within a country corresponding to the dialed NSD access code such that an area code will immediately follow; and means for displaying a remote time and remote date of the called place if the called place is in a different time zone than that of the caller.

22. An international time indicating system as defined in claim 1, further including means for displaying a telephone number corresponding to a caller's location in the local time display, and means for displaying a telephone number corresponding to a called place in the remote time display.

* * * * *

UNITED STATES PATENT AND TRADEMARK OFFICE
CERTIFICATE OF CORRECTION

PATENT NO. : 5,528,558
DATED : June 18, 1996
INVENTOR(S) : Mardhekar et al.

It is certified that error appears in the above-indentified patent and that said Letters Patent is hereby corrected as shown below:

Title page, item [76]

Please delete "Rajeey Pandit" and substitute --Rajeev Pandit--

Column 14:
<u>In Claim 1, Line 29</u>:

Please delete " local country" and substitute --possible local--

Signed and Sealed this

Twenty-second Day of October, 1996

Attest:

BRUCE LEHMAN

*Attesting Officer*        *Commissioner of Patents and Trademarks*